United States Patent [19]

Konovenko et al.

[11] 4,211,685

[45] Jul. 8, 1980

[54] ADHESIVE COMPOSITION

[76] Inventors: Grigory M. Konovenko, ulitsa Posmitnogo, 25, kv. 15; Svetlana L. Slipchenko; Vladimir M. Markus, both of Proletarsky bulvar, 12, kv. 13; Nina N. Kasjura, ulitsa Segedskaya, 3, kv. 44, all of Odessa, U.S.S.R.

[21] Appl. No.: 934,072

[22] Filed: Aug. 16, 1978

[51] Int. Cl.$^2$ ............................................. C08K 5/15
[52] U.S. Cl. ............................ 260/30.4 EP; 260/37 EP
[58] Field of Search ................ 260/37 EP, 30.4 EP, 260/830 TW

[56] References Cited

U.S. PATENT DOCUMENTS

| | | | |
|---|---|---|---|
| 3,003,798 | 10/1961 | Sandlin | 260/37 EP |
| 3,134,754 | 5/1964 | Brunner et al. | 260/30.4 EP |
| 3,365,516 | 1/1968 | Prescott et al. | 260/830 TW |
| 3,829,354 | 8/1974 | Bertram et al. | 260/830 TW |
| 4,115,599 | 9/1978 | Taylor | 260/380 TW |

*Primary Examiner*—Lewis T. Jacobs
*Attorney, Agent, or Firm*—Holman & Stern

[57] ABSTRACT

Adhesive composition, comprising the following ingredients (wt. %):

low molecular dianic epoxy resin as a binder: 20.0–50.0 a mixture of phenyl-glycidyl ether and aliphatic epoxy resin taken in the weight ratio of (0.5 to 1.5):1 used as a plasticizer: 2.0–15.0 polyethylene polyamine as a hardener: 2.0–8.0 aluminium oxide modified with chromium oxide and having the form of a powder with a minimum particle size of 50μ, used as a filler: 25.0–60.0.

4 Claims, No Drawings

ADHESIVE COMPOSITION

BACKGROUND OF THE INVENTION

1. Field of the Invention

The present invention relates to light-transmitting adhesive compositions having high heat conductivity, high volume resistivity and sufficiently high dielectric and mechanical strength.

Adhesive compositions of this type can be used for joining the elements of optical systems and hermetically sealing solid laser units.

2. Description of the Prior Art

Adhesive compositions have found a wide and successful application in today's industry. Therefore, in most cases where a necessity to use adhesives arises, the technical problem can be successfully solved by using the materials available in the market and conventional methods of compounding and testing the compositions.

Thus there can be solved in most cases the problems of developing, for example, high strength adhesives, dielectric adhesives, heat-resistant adhesive compositions. However, the attempts to apply adhesive compositions made by minor modifications of prior art compositions in manufacturing certain kinds of products prove to be unsatisfactory.

Specifically, adhesive compositions for lasers along with traditionally important properties such as adhesive capacity, mechanical and dielectric strength, adequate heat resistance, must also exhibit high transparency and heat conductivity.

Each of these additional properties together with traditionally required ones can be rather easily imparted to various adhesive compositions. However, it is quite a problem to simultaneously provide for transparency and heat conductivity.

For example, mixtures of epoxy resins are known to be based with at least two epoxy groups in a molecule and hardeners substantially of the polyamide type as adhesive compositions in manufacturing light-transmitting laminates (see CFR Patent No. 1594044).

Adhesive compositions of the type referred to hereinabove have adequate adhesion, mechanical and dielectric strength, are good dielectrics and transmit more than 90% of light.

However, low heat conductivity of these compositions precludes their use for cementing together the elements of optical systems and for hermetially sealing the units of solid lasers.

Heat conductivity can be improved by using adhesive compositions with heat conducting fillers.

Thus, there is known an adhesive composition comprising the following ingredients (wt.%):

low molecular dianic epoxy resin: 100
polyethylene polyamine as a hardener: 10 to 15
powdered synthetic diamond as a filler: 200 to 250
(cf. USSR Inventor's Certificate No. 306,161).

The term "low molecular dianic epoxy resin" is used here and hereinafter to denote epoxy resin which is obtained by condensation of diphenylol propane and epichlorohydrin in the presence of an alkali, has not less than 18% of epoxy groups (as determined by the interaction of the resin with hydrochloric acid), is liquid at room temperature, and light yellow to light brown in colour.

The term "polyethylene polyamine" is used here and hereinafter to denote a hardener obtained by the interaction of dichloroethane and an aqueous ammonia solution and having the form of an oily light- to dark brown liquid viscous at room temperature with a density of from 1.00 to 1.04 g/cm$^3$ and a maximum amine nitrogen content 22%.

The above composition while having adequate adhesion, mechanical and dielectric strength, high volume resistivity and heat conductivity within the range of from 2.0 to 2.2 wt/m·°K. is inadequately transparent. Its luminous transmissivity in the wavelength working range of lasers with active elements from ruby, garnet, sapphire is not more than 25%. Moreover, the viscosity of the described adhesive composition is rather high, which makes its preparation and use more difficult.

It is the main object of the present invention to simultaneously provide for both high heat conductivity and transparency of adhesive composition.

It is another object on the present invention to simplify the preparation and use of adhesive compositions.

SUMMARY OF THE INVENTION

The above objects are accomplished due to the fact that the adhesive composition, comprising low-molecular dianic epoxy resin as a binder, polyethylene polyamine as a hardener, and a powdered filler, according to the invention, additionally contains an active plasticizer which is a mixture of phenyl-glycidyl ether and aliphatic epoxy resin taken in a weight ratio of (0.5 to 1.5):1 and contains, finely divided aluminium oxide as a powdered filler, modified with chromium oxide additive, the above indicated ingredients being taken in the following ratio (wt.%):

low molecular dianic epoxy resin: 20.0 to 50.0
the mixture of phenyl-glycidyl ether and aliphatic epoxy resin in the weight ratio of (0.5 to 1.5):1: 2.0 to 15.0
polyethylene polyamine: 2.0 to 8.0
finely divided aluminium oxide modified with chromium oxide: 25.0 to 60.0

The term "aliphatic epoxy resin" is used here and hereinafter to denote low molecular epoxy resins obtained by the condensation of di-or triethylene glycol and epichlorohydrin in the presence of an alkali.

The use of low-molecular (maximum molecular weight not to exceed 500 oxygen units) dianic epoxy resin as a binder, which resin is at room temperature a liquid obtained by the condensation of diphenylol propane and epichlorohydrin makes it possible to introduce up to 300 parts by weight of a filler per 100 parts by weight of resin while retaining fluidity sufficient for process purposes.

The introduction of a plasticizer makes it possible to further increase fluidity, and the use as a plasticizer of the amine type substances reactive in the presence of hardeners, viz., phenyl-glycidyl ether and aliphatic epoxy resin, ensures the stability of the physical properties of the hardened adhesive composition as with time.

The use of polyethylene polyamine as a hardener is the most effective technologically as it provides for cementing together optical system elements and hermetically sealing solid laser units at room temperature.

It is preferable that the average size of particles of said finely divided aluminium oxide modified with chromium oxide be not less than 50μ. Apart from this requirement, the average size of these particles is determined by the permissible thickness of an adhesive layer. In this case light transmission within the wavelength range of from 0.4 to 1.2μ is not less than 60% and heat conductivity is not lower than 1.3 ω/m·°K.

It is convenient to use finely divided ruby as the above indicated finely divided aluminium oxide modified with chromium oxide. This ensures minimum 80% of light transmission within the wavelength range of from 0.6 to 1.2μ and heat conductivity within the range of from 1.5 to 2.0 ω/m·°K.

It is also convenient to use sapphire as the above indicated finely divided aluminium oxide modified with chromium oxide. In this case, minimum light transmission obtained is 60 to 65% within the wavelength range of from 0.4 to 1.0μ and heat conductivity within the range of from 1.3 to 1.5 ω/m·°K.

It is to be noted that synthetic rubies and sapphires are most suitable as fillers in adhesive compositions for connecting and hermetically sealing the elements of solid lasers with active elements from ruby, garnet, and sapphire since these adhesive compositions are compatible with pumping elements as far as their optical properties are concerned.

As it is quite clear to those skilled in the art, main raw material for the production of fillers for the adhesive compositions of the present invention may be wastes from machining of synthetic rubies and sapphires.

DETAILED DESCRIPTION OF THE INVENTION

The adhesive composition of the present invention may be obtained by the procedure comprising the following steps:

preparing a mixture of phenyl-glycidyl ether and aliphatic epoxy resin taken in the weight ratio of (0.5–1.5):1, used as a plasticizer;

heating the low molecular dianic epoxy resin at a temperature of from 40° to 45° C. for 2 to 3 hours to remove volatile impurities and reduce the viscosity;

drying finely divided aluminium oxide modified with chromium oxide at a temperature of from 80° to 85° C. for 2 to 3 hours, used as a filler;

proportioning the above-indicated ingredients according to predetermined quantities;

blending the plasticizer and low-molecular dianic epoxy resin;

introducing the filler into the thus-obtained mixture and additional stirring, under a visual control of the mixture homogeneity;

measuring the predetermined amount of polyethylene polyamine, used as a hardener;

introducing the hardener into the mixture composed of the above mentioned ingredients and additionally stirring the mixture until a homogeneous adhesive composition is obtained.

Ready-for-use adhesive composition of the present invention is characterized by the following properties:

relative viscosity at a temperature of 42°±2° C. determined by the time of a 50-ml sample outflow from a vessel with a cylindric wall and tapered bottom (the angle at the cone vertex is 101°41') provided through the centerthereof with a nozzle 5.4 mm in diameter: max 15 min lifetime—at a temperature of 42°±2° C.: min 30 min at room temperature of (18°–20° C.): min 50 min Cementing together the elements of optical systems and hermetically sealing solid laser units with the adhesive composition of the present invention is effected by the methods known in the art. Hardening time at room temperature is up to 24 hours and this can be reduced, if necessary, by heating cemented elements or hermetically sealed units, for example, in a drying cabinet to a temperature not exceeding 80° C. Thus, hardening time of the adhesive composition at a temperature of 60°±2° C. is not more than 8 hours.

In the hardened state the adhesive composition of the present invention is characterized by the following properties:

coefficient of thermal conductivity, W/m·°K.
  with ruby filler: 1.5 to 2.0
  with sapphire filler: 1.3 to 1.5
light transmission, %
  with ruby filler (wavelength range of from 0.6 to 1.2μ): min 74
  with sapphire filler (wavelength range of from 0.4 to 1.0μ): min 60
volume resistivity, Ohm·cm: min $10^{13}$
tensile strength, kgf/cm$^2$: min 370
adhesion to solid laser optical system materials, kgf/cm$^2$: min 180
dielectric strength, kV/mm: min 10

In commercial production the adhesive composition of the present invention can be manufactured for selling as two component parts. In this case part 1 contains low molecular dianic epoxy resin, plasticizer and filler mixture prepared, measured and blended in the manner described above, and part 2 is the hardener.

Both parts may be mixed together immediately before use. This being the case, it is recommended that part 1 be heated to a temperature of 48°±2° C. prior to introducing part 2 (herdener) thereinto.

A fuller understanding of the present invention will be had from the following examples of the adhesive composition of the present invention.

EXAMPLE 1

The adhesive composition comprises the following ingredients (in grams per 100 g):

low molecular dianic epoxy resin: 50
the mixture of phenyl-glycidyl ether and triethylene glycol based aliphatic epoxy resin in the weight ratio of 1.5:1 used as a plasticizer: 15
polyethylene polyamine: 8
synthetic ruby in the form of a powder with a minimum average particle size 50μ: 25

The adhesive composition is prepared in the following manner. Phenyl-glycidyl ether and aliphatic epoxy resin are blended in the above indicated ratio. Powdered synthetic ruby is dried at a temperature of from 80° to 85° C. for 2 to 3 hours. Low molecular dianic resin is heated at a temperature of from 40° to 45° C. for 2 to 3 hours to remove volatile impurities therefrom and to reduce the viscosity thereof.

Then the afore indicated ingredients are proportioned as hereinabove indicated the plasticizer and low molecular dianic epoxy resin are blended together, the powdered synthetic ruby is introduced into the thus-obtained mixture and an additional stirring is performed.

The afore indicated mixture is doped with the hardener and the resultant adhesive composition is thoroughly stirred until a homogeneous mass is obtained.

Lifetime of this composition is 35 to 40 min at a temperature of 40°±2° C. and more than one hour at room temperature, and its relative viscosity is about 6 min.

From this adhesive composition there were prepared standard samples for experimental assessing of physicomechanical and dielectric properties thereof. By testing the samples and further statistic processing of the resulting data the following values were obtained:

coefficient of thermal conductivity, wt/m·°K.: 1.80
light transmission within the wavelength range of from 0.6 to 12μ, %: 74.0
volume resistivity, Ohm·cm: $10^{13}$
tensile strength, kgf/cm$^2$: 365
adhesion to solid laser optical system materials, kgf/cm$^2$: min 180
dielectric strength, kV/mm: 10.0

EXAMPLE 2

The adhesive composition comprises the following ingredients (in grams per 100 g):

low molecular dianic epoxy resin: 35
a mixture of phenyl-glycidyl ether and triethylene glycol based aliphatic epoxy resin in the weight ratio 1:1, used as a plasticizer: 9
polyethylene polyamine: 5
synthetic ruby in the form of a powder with a minimum average particle size 50μ: 40

This adhesive composition is obtained by the procedure of Example 1.

Lifetime of this compositions is 35 to 40 min at a temperature of 40°±2° C. and more than one hour at room temperature and its relative viscosity is about 10 min.

From this adhesive composition there were prepared standard samples for experimental assessing of physicomechanical and dielectric properties thereof. By testing the samples and further statistic processing of the resulting data the following values were obtained:

coefficient of thermal conductivity, wt/m·°K.: 1.9
light transmission within the wavelength range of from 0.6 to 1.2μ, %: 78.6
volume resistivity, Ohm·cm: $10^{14}$
dielectric strength, kV/mm: 11.0
tensile strength, kgf/cm$^2$: 374.0
adhesion to solid laser optical system materials, kgf/cm$^2$: min 180

EXAMPLE 3

The adhesive composition comprises the following ingredients (in grams per 100 g):

low molecular dianic epoxy resin: 20
a mixture of phenyl-glycidyl ether and triethylene glycol based aliphatic epoxy resin in the weight ratio of 0.5:1 used as a plasticizer: 2
polyethylene polyamine: 2
synthetic ruby in the form of a powder with a minimum average particle size 50μ: 60

This adhesive composition is obtained by the procedure of Example 1.

Lifetime of this composition is 35 to 40 min at a temperature of 40°±2° C. and more than one hour at room temperature, and its relative viscosity is about 15 min.

From this adhesive composition there were prepared standard samples for experimental assessing of physicomechanical and dielectric properties thereof. By testing the samples and further statistic processing of the resultant data the following values were obtained:

coefficient of thermal conductivity, ω/m·°K.: 2.0
light transmission within the wavelength range of from 0.6 to 1.2μ%: 81,0
volume conductivity, Ohm·cm: $10^{14}$
dielectric strength, kV/mm: 12.0
tensile strength, kgf/cm$^2$: 384
adhesion to solid laser optical system materials, kgf/cm$^2$: min 180

EXAMPLE 4

The adhesive composition comprises the following ingredients (in grams per 100 g):

low molecular dianic epoxy resin: 50
a mixture of phenyl-glycidyl ether and triethylene glycol based aliphatic epoxy resin in the weight ratio of 1.5:1 used as a plasticizer: 15
polyethylene polyamine: 8
synthetic sapphire in the form of a powder with a minimum average particle size 50μ: 25

This adhesive composition is obtained by the procedure of Example 1.

Lifetime of this composition is 35 to 40 min at a temperature 40°±2° C. and more than one hour at room temperature, and its relative viscosity is about 6 min.

From this adhesive composition there were prepared standard samples for experimental assessing of physicomechanical and dielectric properties thereof. By testing the samples and further statistic processing of the resulting data the following values were obtained:

coefficient of thermal conductivity, ω/m·°K.: 1.3
light transmission within the wavelength range of from 0.4 to 1.0μ, %: 60
volume conductivity, Ohm·cm: $10^{13}$
dielectric strength, kV/mm: 10.0
tensile strength, kgf/cm$^2$: min 250
adhesive to solid laser optical system materials, kgf/cm$^2$: min 180

EXAMPLE 5

The adhesive composition comprises the following ingredients (in gram per 100 g):

low molecular dianic epoxy resin: 35
a mixture of phenyl-glycidyl ether and triethylene glycol based aliphatic epoxy resin in the weight ratio 1:1 used as a plasticizer: 9
polyethylene polyamine: 5
synthetic sapphire in the form of a powder with a minimum average particle size 50μ: 40

This adhesive composition is obtained by the procedure of Example 1.

Lifetime of this composition is 35 to 40 min at a temperature of 40°±2° C. and more than one hour at room temperature, and its relative viscosity is about 10 min.

From this adhesive composition there were prepared standard samples for experimental assessing of physicomechanical and dielectric properties thereof. By testing the samples and further statistic processing of the resulting data the following values were obtained:

coefficient of thermal conductivity, ω/m·°K.: 1.4
light transmission within the wavelength range of from 0.4 to 1.0μ, %: 66
volume resistivity, Ohm·cm: $10^{14}$
dielectric strength, kV/mm: 11.0
tensile strength, kgf/cm$^2$: min 250
adhesion to solid laser optical system materials, kgf/cm$^2$: min 180

EXAMPLE 6

The adhesive composition comprises the following ingredients (in grams per 100 g):

low molecular dianic epoxy resin: 20
a mixture of phenyl-glycidyl ether and triethylene glycol based aliphatic epoxy resin in the weight ratio of 0.5:1 used as a lasticizer: 2 polyethylene polyamine: 2 synthetic sapphire in the form of a powder with a minimum average particle size 50μ: 60

This adhesive composition is obtained by the procedure of Example 1.

Lifetime of this composition is 35 to 40 min at a temperature of 40°±2° C. and more than one hour at room temperature, and its relative viscosity is 15 min.

From this adhesive composition there were prepared standard samples for experimental assessing of physicomechanical and dielectric properties thereof. By testing the samples and further statistical processing of the resulting data the following values were obtained:

coefficient of thermal conductivity, ω/m·°K.: 1.5 light transmission within the wavelength range of from 0.4 to 1.0μ, %: 70 volume resistivity, Ohm·cm: $10^{14}$ dielectric strength, kV/mm: 12.0 tensile strength, kgf/cm$^2$: min 250 adhesion to solid laser optical system materials, kgf/cm$^2$: min 180

From the foregoing examples it is evident that the adhesive composition of the present invention has high thermal conductivity and high transparency along with adequate other physico-mechanical properties.

Various other modifications are also possible without departing from the spirit and scope of the invention as defined in the claims.

What we claim is:

1. An adhesive composition, comprising the following ingredients (wt.%):
   low molecular dianic epoxy resin as a binder: 20.0 to 50.0
   a mixture of phenyl-glycidyl ether and aliphatic epoxy resin taken in the weight ratio of (0.5 to 1.5):1.0 used as a plasticizer: 2.0 to 15.0
   polyethylene polyamine as a hardener: 2.0 to 8.0
   finely divided aliminium oxide modified with chromium oxide in single crystal form: 25.0 to 60.0.

2. An adhesive composition in accordance with claim 1, wherein said finely divided aluminium oxide modified with chromium oxide addition has a minimum particle size of 50μ.

3. An adhesive composition in accordance with claim 2, wherein said finely divided aluminium oxide modified with chromium oxide addition is a ruby.

4. An adhesive composition in accordance with claim 2, wherein said finely divided aluminium oxide modified with chromium oxide addition is a sapphire.

* * * * *